US011908671B2

(12) United States Patent
Takahashi et al.

(10) Patent No.: US 11,908,671 B2
(45) Date of Patent: Feb. 20, 2024

(54) ION ANALYZER

(71) Applicants: SHIMADZU CORPORATION, Kyoto (JP); NATIONAL INSTITUTE OF ADVANCED INDUSTRIAL SCIENCE AND TECHNOLOGY, Tokyo (JP)

(72) Inventors: Hidenori Takahashi, Kyoto (JP); Daiki Asakawa, Tsukuba (JP)

(73) Assignees: SHIMADZU CORPORATION, Kyoto (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 204 days.

(21) Appl. No.: 17/599,136

(22) PCT Filed: Apr. 2, 2019

(86) PCT No.: PCT/JP2019/014576
§ 371 (c)(1),
(2) Date: Nov. 3, 2021

(87) PCT Pub. No.: WO2020/202455
PCT Pub. Date: Oct. 8, 2020

(65) Prior Publication Data
US 2022/0157586 A1 May 19, 2022

(51) Int. Cl.
*H01J 49/00* (2006.01)
*H01J 49/06* (2006.01)

(52) U.S. Cl.
CPC ........ *H01J 49/0072* (2013.01); *H01J 49/068* (2013.01)

(58) Field of Classification Search
CPC .. H01J 49/0072; H01J 49/068; H01J 49/0077; H01J 49/0486; H01J 49/0027
See application file for complete search history.

(56) References Cited

U.S. PATENT DOCUMENTS

2016/0372311 A1 12/2016 Takahashi et al.
2020/0111654 A1 4/2020 Takashashi et al.

FOREIGN PATENT DOCUMENTS

WO 2015/133259 A1 9/2015
WO 2018/186286 A1 10/2018

OTHER PUBLICATIONS

Yuji Shimabukuro, et al., "Tandem Mass Spectrometry of Peptide Ions by Microwave Excited Hydrogen and Water Plasmas", Analytical Chemistry, 2018, pp. 7239-7245, vol. 90, No. 12.

(Continued)

*Primary Examiner* — Rebecca C Bryant
*Assistant Examiner* — Christopher J Gassen
(74) *Attorney, Agent, or Firm* — Sughrue Mion, PLLC

(57) ABSTRACT

An ion analyzer includes a reaction chamber into which precursor ions derived from a sample component are introduced, a radical irradiation unit that generates and emits a predetermined type of radicals, a standard substance supply unit that individually supplies kinds of standard substances to the reaction chamber, where activation energy of radical addition reaction is known for each of the kinds of standard substances, and the activation energies are different in magnitude, an ion measurement unit that measures an amount of predetermined product ions generated from precursor ions derived from the standard substance by irradiation with the radicals, and a radical temperature calculation unit that obtains an amount of radicals that caused the radical addition reaction from the amount of the predetermined product ions and obtains a radical temperature based on a relationship between the amount of the radicals obtained for each kind of standard substance and activation energy.

5 Claims, 4 Drawing Sheets

(56) References Cited

OTHER PUBLICATIONS

International Search Report for PCT/JP2019/014576 dated Jun. 25, 2019 (PCT/ISA/210).

Written Opinion for PCT/JP2019/014576 dated Jun. 25, 2019 (PCT/ISA/237).

Notice of Allowance dated Dec. 6, 2022 in Japanese Patent Application No. 2021-511820.

ION ANALYZER

CROSS REFERENCE TO RELATED APPLICATIONS

This application is a National Stage of International Application No. PCT/W2019/014576 filed Apr. 2, 2019.

TECHNICAL FIELD

The present invention relates to an ion analyzer that irradiates ions derived from a sample component with radicals for analysis.

BACKGROUND ART

In order to identify a high polymer compound or analyze a structure of a high polymer compound, a type of mass spectrometry is widely used in which ions derived from a high polymer compound (precursor ions) are dissociated one or more times to generate product ions (also referred to as fragment ions), and the product ions are separated according to mass-to-charge ratio and detected. As a representative method for dissociating ions in such mass spectrometry, the collision-induced dissociation (CID) method in which molecules of an inert gas such as nitrogen gas are made to collide with ions is known. The CID method, in which ions are dissociated by the collision energy with inert molecules, can cause dissociation of various ions, but has poor capability in selecting a position where ions are dissociated. Therefore, the CID method is unsuitable for a case where ions are to be dissociated at a specific site for structural analysis. For example, when analyzing a peptide or the like, it is desirable to specifically dissociate the peptide at a position where amino acids are linked, but such dissociation is difficult when using the CID method.

As an ion dissociation method for specifically dissociating a peptide at a position where amino acids are linked, the electron transfer dissociation (ETD) method in which precursor ions are made to collide with negative ions and the electron capture dissociation (ECD) method in which precursor ions are irradiated with electrons have been conventionally used. These methods are referred to as unpaired electron-induced dissociation method in which N—α bonds of peptide main chains are dissociated to generate product ions of c/z-type.

In the ETD method and the ECD method, when the precursor ions are positive ions, the valence of ions decreases by dissociation. That is, when a monovalent positive ion is dissociated, a neutral molecule is generated. Thus, only positive ions with valence of two or higher are analyzable. Accordingly, the ETD method and the ECD method do not make a good combination with the MALDI method that generates a number of monovalent positive ions.

One of the inventors has proposed hydrogen-attached dissociation (HAD) method in which unpaired electron-induced dissociation is caused by irradiating precursor ions derived from a peptide with hydrogen radicals (Patent Literature 1). The HAD method is suitable for combination with the MALDI method because the valence of precursor ions does not change by dissociation. Also by the HAD method, product ions of c/z-type can be generated.

One of the inventors has also proposed dissociating precursor ions derived from a peptide specifically at positions where amino acids are linked using hydroxyl radicals, oxygen radicals, or nitrogen radicals (Patent Literature 2).

When the precursor ions derived from a peptide are irradiated with radicals, product ions of a/x-type and/or product ions of b/y-type are generated.

CITATION LIST

Patent Literature

Patent Literature 1: WO 2015/133259 A

Patent Literature 2: WO 2018/186286 A

Non Patent Literature

Non Patent Literature 1: Yuji Shimabukuro, Hidenori Takahashi, Shinichi Iwamoto, Koichi Tanaka, Motoi Wada, "Tandem Mass Spectrometry of Peptide Ions by Microwave Excited Hydrogen and Water Plasmas", Anal. Chem. 2018, 90 (12) pp 7239-7245

SUMMARY OF INVENTION

Technical Problem

The efficiency of reaction between precursor ions and radicals depends on the energy of the radicals. The energy of radicals, which is mainly kinetic energy of the radicals, can be expressed by radical temperature. Irradiating precursor ions with radicals having a low temperature does not cause reaction at a sufficient level. For example, Non-Patent Literature 1 discloses that irradiating a peptide with hydrogen radicals generated by an electron cyclotron resonance (ECR) inductively coupled plasma (ICP) source did not cause sufficient dissociation, and discusses that the insufficient dissociation is due to a low radical temperature of the radicals generated by the plasma source. Meanwhile, an excessively high radical temperature causes dissociation of precursor ions at undesired positions.

Conventionally, there is no method for directly measuring the temperature of the radicals with which precursor ions derived from a sample are irradiated, so that a condition for irradiating the precursor ions with radicals having appropriate radical temperatures is searched by trying various conditions for irradiation with the radicals. This disadvantageously makes it difficult to specifically dissociate an object peptide between amino acids.

Exemplarily described above is the case where product ions generated by dissociating precursor ions by irradiation with radicals are subjected to mass spectrometry. The same problem also lies in a case of separating and measuring product ions according to ion mobility.

An object of the present invention is to provide a technique for measuring the radical temperature in an ion analyzer in which precursor ions derived from a sample component are irradiated with radicals for analysis.

Solution to Problem

The present invention made to solve the above-mentioned problem provides an ion analyzer for analyzing product ions generated by irradiating precursor ions derived from a sample component with radicals, the ion analyzer including:

a reaction chamber into which the precursor ions are introduced;

a radical irradiation unit configured to generate a predetermined kind of radicals and emit the radicals to an inside of the reaction chamber;

a standard substance supply unit configured to supply a plurality of kinds of standard substances to the reaction chamber, where activation energy of reaction in which the predetermined kind of radicals are added is known for each of the plurality of kinds of standard substances, and the activation energies are different in magnitude;

an ion measurement unit configured to measure an amount of predetermined product ions generated from precursor ions derived from each of the plurality of kinds of standard substance by irradiation with the radicals; and a radical temperature calculation unit configured to obtain an amount of radicals that caused radical addition reaction from the amount of the predetermined product ions and obtain a radical temperature based on a relationship between the amount of the radicals obtained for each of the plurality of kinds of standard substances and the activation energies.

Advantageous Effects of Invention

In an ion analyzer according to the present invention, for each of a plurality of kinds of standard substances having different activation energies of radical addition reaction (a standard substance having an activation energy of 0 may be included), the amount of predetermined product ions generated by irradiating precursor ions derived from the standard substance with radicals is measured. The predetermined product ions are typically radical adduct ions, but may be fragment ions when the precursor ions are dissociated by radical addition reaction. The amount of the predetermined product ions reflects the amount of radicals that caused the radical addition reaction, and the amount of radicals is the amount of radicals that have energy equal to or higher than the activation energy of the radical addition reaction of the standard substance. Since the energies of respective radicals generated and emitted for irradiation by the radical irradiation unit are statistically distributed, the radical temperature is obtained based on the amount of radicals that caused radical addition reaction with regard to each of a plurality of standard substances and the activation energies of radical addition reaction of the standard substances.

DESCRIPTION OF EMBODIMENTS

One embodiment of an ion analyzer according to the present invention will be described below with reference to the drawings. The ion analyzer of the embodiment is an ion trap-time-of-flight (IT-TOF) mass spectrometer.

Figure 1:
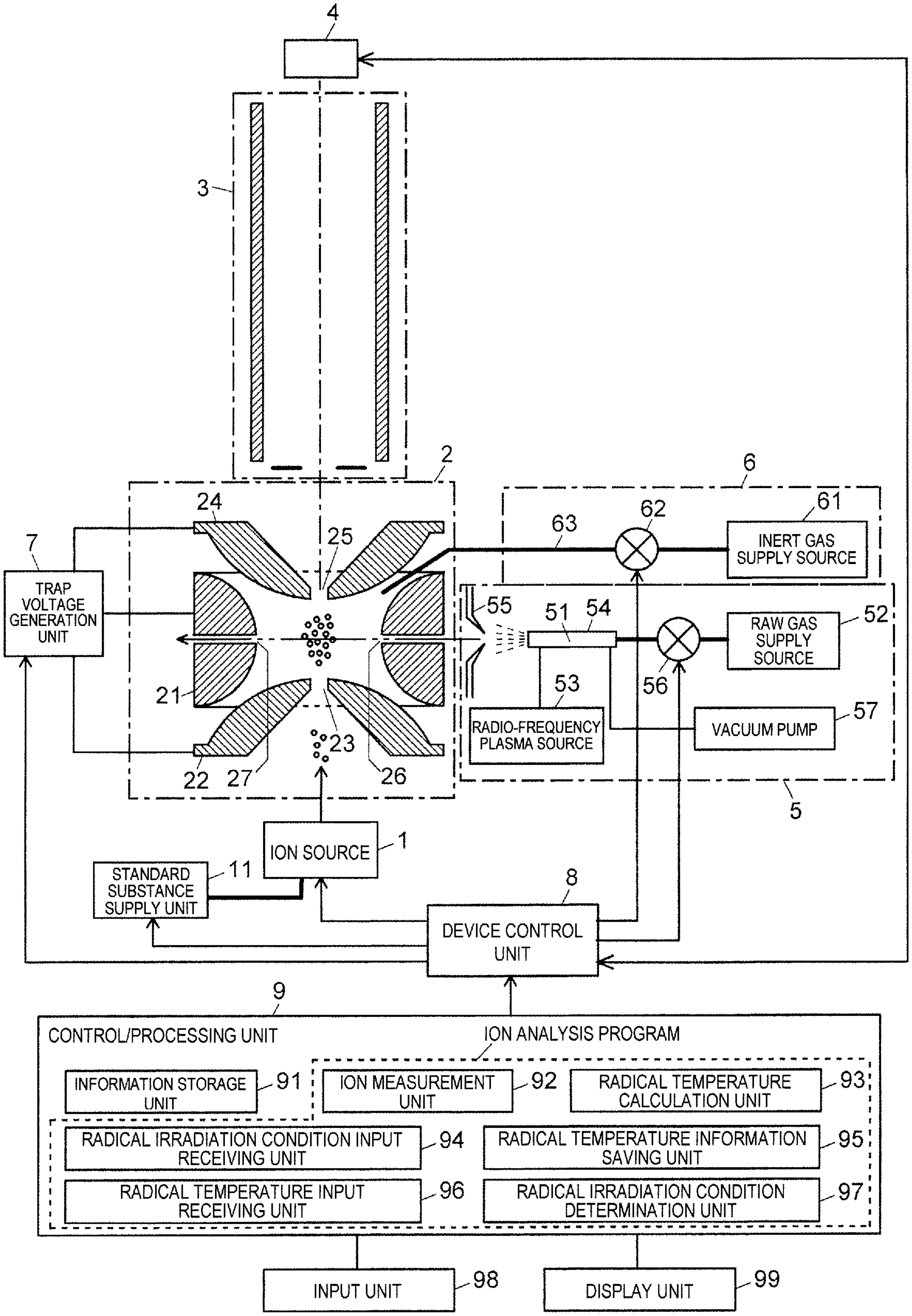
FIG. 1 is a schematic configuration diagram of an ion trap-time-of-flight mass spectrometer that is one embodiment of an ion analyzer according to the present invention.

FIG. 1 illustrates a schematic configuration of the ion trap-time-of-flight mass spectrometer (hereinafter, also simply referred to as "mass spectrometer") of the embodiment. The mass spectrometer of the embodiment includes, in a vacuum chamber (not illustrated) in which vacuum atmosphere is maintained, an ion source 1 that ionizes a component in a sample, an ion trap 2 that traps ions generated by the ion source 1 by the action of a radio-frequency electric field, a time-of-flight mass separation unit 3 that separates ions ejected from the ion trap 2 according to mass-to-charge ratio, and an ion detector 4 that detects the separated ions. The ion trap mass spectrometer of the embodiment further includes a radical irradiation unit 5 for irradiating precursor ions trapped in the ion trap 2 with radicals to dissociate the ions trapped in the ion trap 2, an inert gas supply unit 6 that supplies a predetermined inert gas into the ion trap 2, a trap voltage generation unit 7, a device control unit 8, and a control/processing unit 9. The device control unit 8 controls operations of the units of the mass spectrometer based on a control signal transmitted from the control/processing unit 9.

Figure 2:
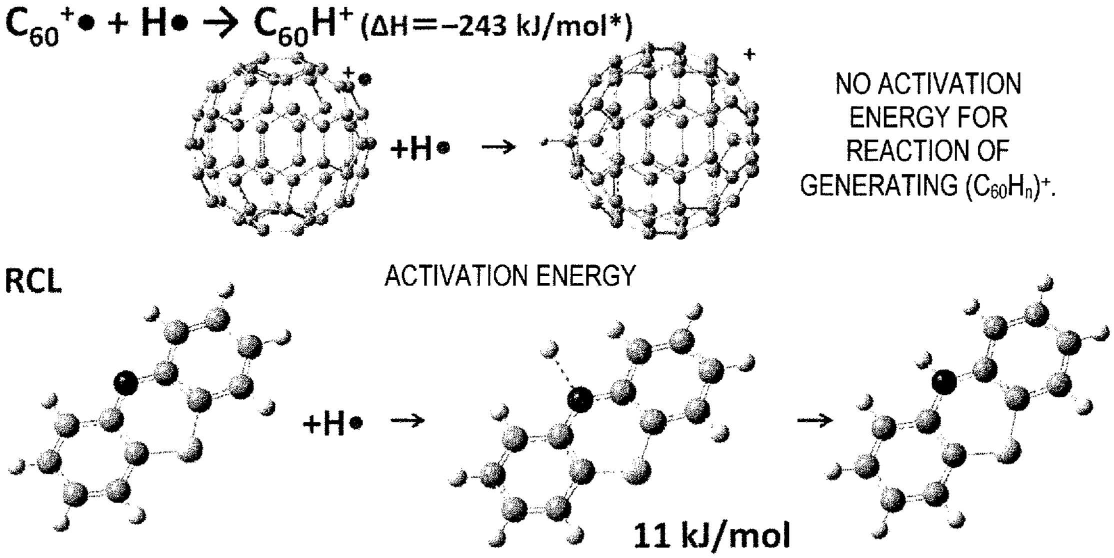
FIG. 2 is a figure for explaining molecular structures and activation energies of fullerene and RCL each used as a standard substance in the embodiment.

A standard substance supply unit 11 is connected to the ion source 1, and a plurality of kinds of standard substances can individually be supplied from the standard substance supply unit 11 to the ion source 1 under the control of the device control unit 8. In the embodiment, fullerene and RCL (phenothiazine-5-ium) are individually supplied to the ion source 1 as standard substances. The activation energy of hydrogen radical attachment reaction of fullerene is 0 kJ/mol, and the activation energy of hydrogen radical attachment reaction of RCL is 11 kJ/mol (see FIG. 2).

The ion trap 2 is a three-dimensional ion trap including an annular ring electrode 21 and a pair of end cap electrodes (an inlet-side end cap electrode 22 and an outlet-side end cap electrode 24) disposed to oppose each other with the ring electrode 21 between them. A radical particle introduction port 26 and a radical particle discharge port 27 are formed in the ring electrode 21. An ion introduction hole 23 is formed in the inlet-side end cap electrode 22. An ion ejection hole 25 is formed in the outlet-side end cap electrode 24. Under the control of the device control unit 8, the trap voltage generation unit 7 applies one of a radio-frequency voltage, a direct-current voltage, and a combined voltage of the high-frequency voltage and the direct-current voltage to each of the electrodes 21, 22, and 24 at a predetermined timing.

The radical irradiation unit 5 includes a nozzle 54 having a radical generation chamber 51 formed inside the nozzle 54, a raw gas supply unit (raw gas supply source) 52 for introducing raw gas into the radical generation chamber 51, a vacuum pump (evacuating unit) 57 for evacuating the radical generation chamber 51, an inductively coupled radio-frequency plasma source 53 for supplying a microwave for generating a vacuum electrical discharge in the radical generation chamber 51, a skimmer 55 that has an opening on a central axis of the jet flow from the nozzle 54 and separates diffused raw gas molecules and the like to abstract a radical flow having a small diameter, and a valve 56 provided on the flow path from the raw gas supply source 52 to the radical generation chamber 51. In the embodiment, hydrogen gas is used as a raw gas to generate hydrogen radicals.

Figure 3:
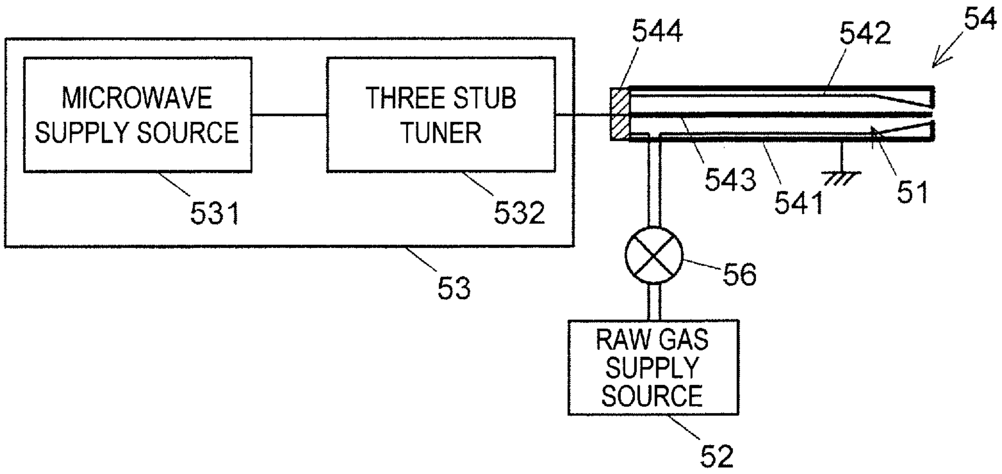
FIG. 3 is a schematic configuration diagram of a radical irradiation unit used in the ion trap-time-of-flight mass spectrometer of the embodiment.

FIG. 3 illustrates a schematic configuration of the radical irradiation unit 5. Main components of the radical irradiation unit 5 are the raw gas supply source 52, the radio-frequency plasma source 53, and the nozzle 54. The radio-frequency plasma source 53 includes a microwave supply source 531 and a three stub tuner 532. The nozzle 54 includes a ground electrode 541 constituting an outer peripheral portion and a torch 542 made of Pyrex (registered trademark) glass located inside the ground electrode 541, and the inside of the torch 542 serves as the radical generation chamber 51. Inside the radical generation chamber 51, a needle electrode 543 connected to the radio-frequency plasma source 53 via a connector 544 penetrates in the longitudinal direction of the radical generation chamber 51. A flow path for supplying the raw gas from the raw gas supply source 52 to the radical generation chamber 51 is provided, and a valve 56 for adjusting the flow rate of the raw gas is provided on the flow path.

The inert gas supply unit 6 includes an inert gas supply source 61 storing helium, argon, or the like used as buffer gas or cooling gas, a valve 62 for adjusting the flow rate of the inert gas, and a gas inlet pipe 63.

In addition to an information storage unit 91, the control/processing unit 9 includes an ion measurement unit 92, a radical temperature calculation unit 93, a radical irradiation condition input receiving unit 94, a radical temperature information saving unit 95, a radical temperature input receiving unit 96, and a radical irradiation condition determination unit 97 as functional blocks. The control/processing unit 9 is actually a personal computer, and the above-described functional blocks are embodied by executing an ion analysis program previously installed in the computer. An input unit 98 and a display unit 99 are connected to the control/processing unit 9.

An example of obtaining a radical temperature using the mass spectrometer of the embodiment will now be described. The example is performed after a useful measurement result is obtained under a certain radical irradiation condition for a certain sample to be analyzed.

When a user gives instruction to start measuring the radical temperature, the radical irradiation condition input receiving unit 94 displays on the display unit 99 a screen for inputting a radical irradiation condition to prompt the user to input the radical irradiation condition. In the embodiment, the radical irradiation condition including the kind and flow rate of raw gas supplied from the raw gas supply source 52 (hydrogen gas with the flow rate of 2 sccm, in the embodiment), the current supplied to the radio-frequency plasma source 53 (10 A, in the embodiment), and a radical irradiation time (100 ms, in the embodiment) is input. When the frequency of the microwave is variable, a frequency is also included in the radical irradiation condition.

When the radical irradiation condition is input, the ion measurement unit 92 controls the operation of each unit through the device control unit 8, and performs the following measurement operation using the radical irradiation condition which has been input. First, the inside of the vacuum chamber and the inside of the radical generation chamber 51 are evacuated by a vacuum pump (not shown, 57) to a predetermined vacuum level. Then, the raw gas is supplied from the raw gas supply source 52 to the radical generation chamber 51 of the radical irradiation unit 5 and the microwave is supplied from the radio-frequency plasma source 53, and thereby radicals are generated in the radical generation chamber 51.

A standard substance is supplied to the ion source 1, and various ions generated from the standard substance (mainly, monovalent ions) are ejected from the ion source 1 in a form of a packet. The ejected ions are introduced into the ion trap 2 through the ion introduction holes 23 formed in the inlet-side end cap electrode 22. The ions introduced into the ion trap 2 are captured by a radio-frequency electric field formed in the ion trap 2 by a voltage applied from the trap voltage generation unit 7 to the ring electrode 21. Then, a predetermined voltage is applied from the trap voltage generation unit 7 to the ring electrode 21 and the like, whereby ions other than targeted ions having a specific mass-to-charge ratio, that is, ions of which mass-to-charge ratio is within a certain range of mass-to-charge ratio, are excited and excluded from the ion trap 2. As a result, precursor ions (monovalent molecular ions) derived from the standard substance are selectively trapped in the ion trap 2.

Subsequently, the valve 62 of the inert gas supply unit 6 is opened, and an inert gas such as helium gas is introduced into the ion trap 2. As a result, the precursor ions are cooled and converged at the vicinity of the center of the ion trap 2. Then, the valve 56 of the radical irradiation unit 5 is opened, and the gas containing the radicals generated in the radical generation chamber 51 is jetted from the nozzle 54. The skimmer 55 located in front of the jet flow removes gas molecules, the radicals that have passed through the opening of the skimmer 55 form a beam having a small diameter, and the radicals pass through the radical particle introduction port 26 formed in the ring electrode 21. The radicals are introduced into the ion trap 2, and the precursor ions trapped in the ion trap 2 are irradiated with the radicals.

During the above process, the opening degree and the like of the valve 56 are kept constant, adjusted to keep the flow rate of the radicals with which the ions are irradiated constant. The valve 56 is opened and closed based on the radical irradiation time which has been input by the user. By irradiation with the radicals, product ions derived from the standard substance (hydrogen radical adduct ions, in the embodiment) are generated. The generated product ions are trapped in the ion trap 2 and cooled by helium gas or the like supplied from the inert gas supply unit 6. Then, a high DC voltage is applied from the trap voltage generation unit 7 to the inlet-side end cap electrode 22 and the outlet-side end cap electrode 24 at a predetermined timing, whereby the ions trapped in the ion trap 2 receive acceleration energy and are ejected through the ion ejection holes 25 at once.

In this manner, the ions having a constant acceleration energy are introduced into a flight space of the time-of-flight mass separation unit 3, and are separated according to mass-to-charge ratio while flying in the flight space. The ion detector 4 readily detects the separated ions, and the control/processing unit 9 that has received the detection signal generates, for example, a time-of-flight spectrum in which the timing of ejecting the ions from the ion trap 2 is at the time of zero. Then, the time-of-flight is converted into a mass-to-charge ratio using mass calibration information which is previously obtained, whereby a spectrum of the product ions is created.

The ion measurement unit 92 obtains the amount of predetermined product ions (hydrogen radical adduct ions, in the embodiment) generated by the hydrogen radical attachment reaction from the spectrum of the product ions obtained by performing the above measurement for each of a plurality of standard substances (fullerene and RCL, in the embodiment).

When the amount of the predetermined product ions is obtained for each of a plurality of standard substances (fullerene and RCL, in the embodiment) by the ion measurement unit 92, the radical temperature calculation unit 93 obtains, based on the respective magnitude of activation energy and amount of product ions, the radical temperature of the radicals with which the precursor ions derived from the standard substance are irradiated under the radical irradiation condition input by the user. The method for obtaining the radical temperature will be described in detail later.

When the radical temperature is obtained by the radical temperature calculation unit 93, the radical temperature information saving unit 95 saves, in the information storage unit 91, radical temperature information in which the radical irradiation condition input by the user is associated with the radical temperature obtained for the radical irradiation condition. By repeating the above measurement, radical temperature information obtained for a plurality of radical irradiation conditions is accumulated in the information storage unit 91, and a radical temperature information database is created.

The calculation of the radical temperature by the radical temperature calculation unit 93 will be described in detail below.

When the radical temperature is T, the activation energy of the standard substance A (energy threshold at which radical attachment reaction occurs) is $E_A$, and the activation energy of the standard substance B is $E_B$, only the radicals having energy exceeding the energy threshold, $E_A$ or $E_B$, attach to the precursor ions derived from the respective standard substance. That is, the number of radicals that attach per unit time, $R_X$, is proportional to the number of radicals having thermal energy ($=\frac{1}{2}\times mv^2$) exceeding attachment threshold energy $E_X$, and is expressed by the following formula.

[First formula]

$$R_X \propto \sigma_X F(E_X, T) = \sigma_X \int_{\sqrt{\frac{2E_X}{m}}}^{\infty} f(v, T)dv \quad (1)$$

In the first formula, $\sigma_X$ is the collision cross-sectional area for radical attachment, and f(v, T) is the Maxwell distribution for the radical temperature T. The Maxwell distribution is expressed by the following formula.

[Second formula]

$$f(v, T) = 4\pi v^2\left(\frac{m}{2\pi kT}\right)^{3/2}\exp\left(-\frac{mv^2}{2kT}\right) \quad (2)$$

Under the same radical irradiation condition, ratio k(T), which is the ratio of the number of attached radicals of the standard substance B to the number of attached radicals of the standard substance A, is expressed by the following formula.

[Third formula]

$$k(T) = \frac{\sigma_B R_B}{\sigma_A R_A} = \frac{\sigma_B F(E_B, T)}{\sigma_A F(E_A, T)} \quad (3)$$

In the third formula, $E_A$ and $E_B$ are known values (0 kJ/mol for fullerene, 11 kJ/mol for RCL). The activation energy of the radical addition reaction of fullerene is 0 kJ/mol, and all hydrogen radicals with which the precursor ions are irradiated attach to the precursor ions. That is, the energy threshold of this reaction is 0 kJ/mol. Similarly to an error function of which numerical solution is widely known, an approximate solution of F(E, T) can easily be calculated by a numerical solution method. The collision cross-sectional areas $\sigma_A$ and $\sigma_B$ are determined mainly by the molecular structures of the standard substances A and B, and do not greatly depend on the temperature and amount of the radicals. Since the value of $\sigma_B/\sigma_A$ can be estimated from a numerical simulation, a model calculation, or the like, the radical temperature T can be evaluated from the measured value of k.

Figure 4:
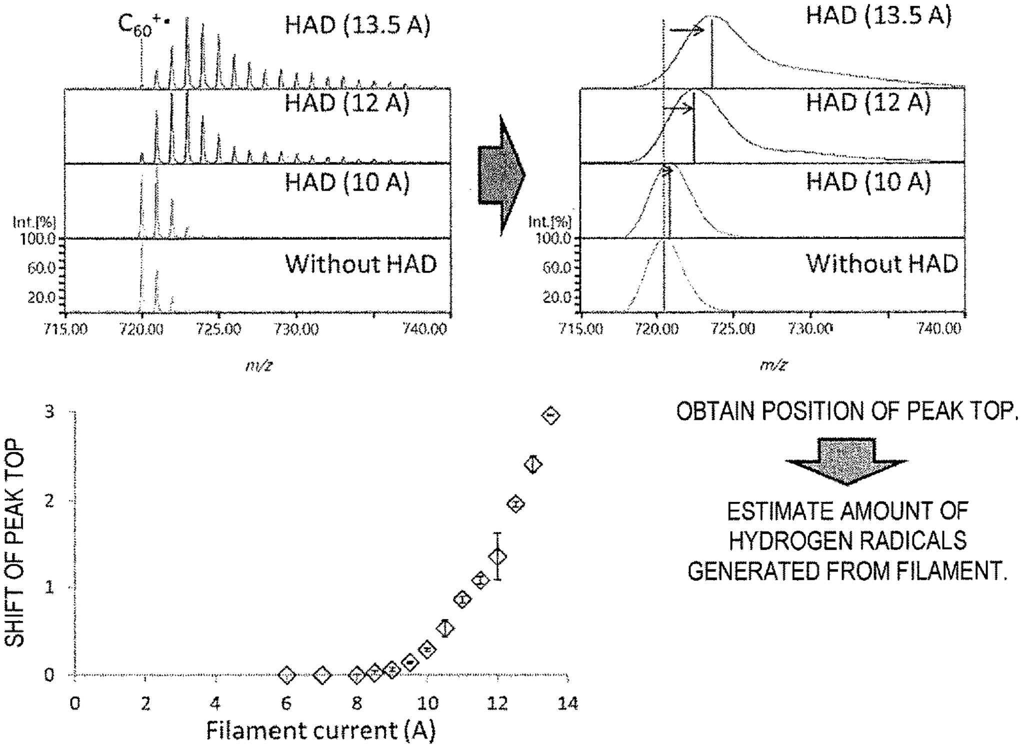
FIG. 4 illustrates a result of irradiating fullerene with hydrogen radicals generated under a plurality of radical irradiation conditions in the mass spectrometer of the embodiment.
Figure 5:
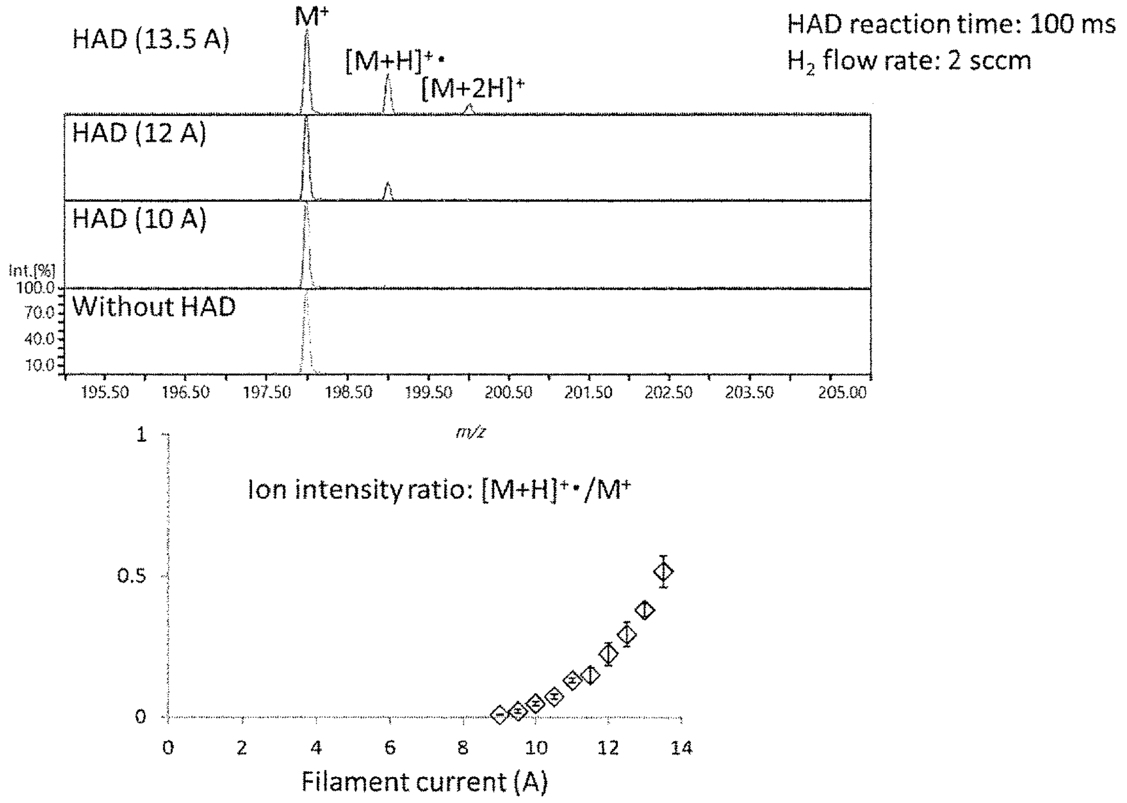
FIG. 5 illustrates a result of irradiating RCL with hydrogen radicals generated under a plurality of radical irradiation conditions in the mass spectrometer of the embodiment.

FIG. 4 illustrates a result obtained by irradiating fullerene with hydrogen radicals. FIG. 5 illustrates a result obtained by irradiating RCL with hydrogen radicals. A thermal-dissociation type of radical generation source was used for those measurements. FIGS. 4 and 5 illustrate the results of measuring product ions under different currents (0 A, 10 A, 12 A, 13.5 A) supplied to a filament with the flow rate of hydrogen radicals of 2 sccm and the radical irradiation time of 100 ms. Setting a plurality of radical irradiation conditions is not necessarily required in the present invention.

The upper left figure in FIG. 4 represents product ion spectrums obtained by measurement, and the upper, right figure represents the product ion spectrums each in a form having a single peak. The lower figure in each of FIGS. 4 and 5 is a chart illustrating the relationship between the current supplied to a filament of the radical source 53 and the shift amount of peak top.

Figure 6:
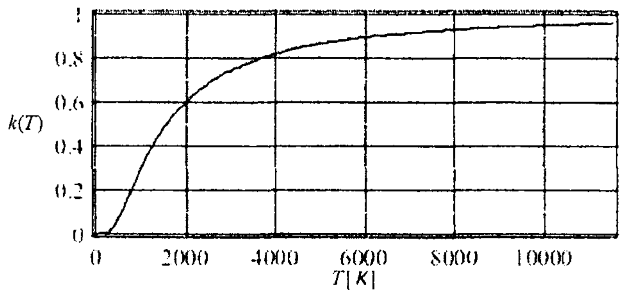
FIG. 6 is a chart illustrating relationship between the radical temperature of hydrogen radicals and the ratio of the amount of radicals related to RCL to the amount of radicals related to fullerene in the mass spectrometer of the embodiment.

FIG. 6 is a chart illustrating the relationship between the radical temperature T and the ratio k(T) of the amount of radicals calculated by a numerical solution method using the first and third formulas for $E_A$=0 kJ/mol (fullerene) and $E_B$=11 kJ/mol (RCL). In the result of HAD (10 A) for fullerene illustrated in FIG. 4, hydrogen is attached to 50% of precursor ions. In the result of HAD (10 A) for RCL illustrated in FIG. 5, hydrogen is attached to 10% of the precursor ions. These results give k(T)=0.2. From this result and the chart in FIG. 6, the radical temperature of the hydrogen radical can be read as 800 K.

As described above, in the ion analyzer of the embodiment, precursor ions derived from a plurality of standard substances of which activation energies of radical addition reaction are known (the standard substances include a standard substance having no activation energy of radical addition reaction and a standard substance having an activation energy of radical addition reaction) are irradiated with radicals, the amount of generated product ions (hydrogen radical adduct ions, in the embodiment) is measured, the amount of radicals that caused the radical addition reaction is obtained from the amount of the product ions, and the radical temperature can be obtained based on the relationship between the amount of radicals obtained for each of a plurality of standard substances and the activation energies.

Now, an example of determining a radical irradiation condition for generating radicals having a desired radical temperature using the mass spectrometer of the embodiment will be described. This example is used when a measurement result obtained by irradiating precursor ions derived from a sample component with radicals having a certain radical temperature is to be reproduced by another mass spectrometer. In this example, a database of radical temperature information in which a radical irradiation condition and a radical temperature are associated with each other is previously stored in the information storage unit 91. The database of radical temperature information is constructed by repeatedly performing the process of the above-described embodiment, and is stored in an appropriate form such as a table or a formula.

In this embodiment, the radical temperature input receiving unit 96 first displays on the display unit 99 a screen for allowing the user to input the radical temperature.

When the radical temperature is input by the user, the radical irradiation condition determination unit 97 refers to the database of radical temperature information stored in the information storage unit 91, and determines the radical irradiation condition for performing irradiation with radicals having the input radical temperature. The radical irradiation condition includes, for example, a kind and flow rate of raw gas supplied from the raw gas supply source 52, a current supplied to the radio-frequency plasma source 53, and a radical irradiation time. When the frequency of the microwave is variable, the frequency is also included in the radical irradiation condition.

When the radical irradiation condition is determined, a sample component to be analyzed is introduced to the ion source 1, and measurement is performed in the same manner as described above. Details of the measurement will be omitted, since the details are the same as those of the above embodiment.

Conventionally, in order to reproduce the measurement result obtained by another mass spectrometer, various radical irradiation conditions needs to be tried to determine the radical irradiation condition. In contrast, by using the mass spectrometer of the embodiment, the radical irradiation condition can easily be determined by simply inputting the radical temperature.

The embodiment and the exemplary modification described above are all examples, and can suitably be altered according to the spirit of the present invention.

Described in the above embodiment is the case where the radical temperature of hydrogen radicals is obtained. The radical temperature of other kinds of radicals such as hydroxyl radicals, oxygen radicals, and nitrogen radicals can be obtained in the same manner. When water vapor is used as a raw gas, hydroxyl radicals, oxygen radicals, and hydrogen radicals are generated. When air is used, oxygen radicals and nitrogen radicals are mainly generated. When oxygen gas is used, oxygen radicals are generated. When nitrogen gas is used, nitrogen radicals are generated. By irradiating precursor ions derived from a peptide with hydrogen radicals, product ions of c/z-type are generated. By irradiating precursor ions derived from a peptide with hydroxyl radicals, oxygen radicals, or nitrogen radicals, product ions of a/x-type and/or b/y-type can be generated.

As described in the previous application by the inventor (PCT/JP2018/043074), by irradiating precursor ions derived from a sample component containing a hydrocarbon chain with radicals having oxidizing ability such as hydroxyl radicals or oxygen radicals, specific dissociation occurs at an unsaturated bond in the hydrocarbon chain, and the structure of the hydrocarbon chain can be estimated from product ions generated by the dissociation. In addition, by generating product ions in which an oxygen atom is added at an unsaturated bond in the hydrocarbon chain, whether the structure of the unsaturated bond of the hydrocarbon is a cis type or a trans type can be estimated.

Furthermore, as described in the previous application mentioned above, by irradiating precursor ions derived from a sample component containing a hydrocarbon chain with radicals having reducing ability such as nitrogen radicals, dissociation specifically occurs at a carbon-carbon bond in the hydrocarbon chain regardless of whether the bond is a saturated bond or an unsaturated bond. The structure of the hydrocarbon chain can be estimated from the generated product ions.

In the above embodiment, two kinds of substances, that is, fullerene having an activation energy of radical addition reaction of 0 J/mol (energy threshold $E_A$=0 kJ/mol) and RCL having an activation energy of 11 kJ/mol (energy threshold $E_B$=11 kJ/mol), are used as standard substances. However, other standard substances that have known activation energies of radical addition reaction different in magnitude from each other can also be used in combination. By using three or more kinds of standard substances, the accuracy of calculating the radical temperature can be further raised. Furthermore, in the above embodiment, product ions are obtained by adding radicals to precursor ions, and the amount of radicals that caused the radical addition reaction is obtained from the amount of the product ions. However, the amount of radicals that caused the radical addition reaction can be obtained from the measured amount of fragment ions generated by dissociation of the precursor ions caused by the radical addition reaction.

The ion trap-time-of-flight mass spectrometer equipped with a three-dimensional ion trap is used in the above embodiment. A linear ion trap or collision cell may be used in place of the three-dimensional ion trap, and it may be configured that irradiation with radicals is performed at the timing when the precursor ions are introduced into the linear ion trap or collision cell. The time-of-flight mass separation unit is a linear type in the embodiment and the exemplary modification. A time-of-flight mass separation unit of a reflectron type or a multi-turn type may be used. Other than the time-of-flight mass separation unit, for example, other types of mass separation unit such as the one that performs mass separation using the ion separation function of the ion trap 2 itself or an orbitrap may be used. The radical irradiation unit described in the embodiment described above can suitably be used not only in a mass spectrometer but also in an ion mobility analyzer. The radio-frequency plasma source is used as a vacuum discharge unit in the embodiment and the exemplary modification. A hollow cathode plasma source may be used instead. Alternatively, radicals may be generated in an atmospheric pressure atmosphere.

Various embodiments of the present invention have been described in detail with reference to the drawing, and lastly, various aspects of the present invention will be described.

An ion analyzer according to a first aspect of the present invention is an ion analyzer for analyzing product ions generated by irradiating precursor ions derived from a sample component with radicals, the ion analyzer including:

a reaction chamber into which the precursor ions are introduced;

a radical irradiation unit configured to generate a predetermined kinds of radicals and emit the radicals to an inside of the reaction chamber;

a standard substance supply unit configured to supply a plurality of kinds of standard substances to the reaction chamber, where activation energy of reaction in which the predetermined kind of radicals are added is known for each of the plurality of kinds of standard substances, and the activation energies are different in magnitude;

an ion measurement unit configured to measure an amount of predetermined product ions generated from precursor ions derived from each of the plurality of kinds of standard substance by irradiation with the radicals; and a radical temperature calculation unit configured to obtain an amount of radicals that caused radical addition reaction from the amount of the predetermined product ions and obtain a radical temperature based on a relationship between the amount of the radicals obtained for each of the plurality of kinds of standard substances and the activation energies.

In the ion analyzer according to the first aspect of the present invention, for each of a plurality of kinds of standard substances having different activation energies of radical addition reaction, the amount of predetermined product ions generated by irradiating the precursor ions derived from the standard substance with radicals is measured. The amount of the predetermined product ions reflects the amount of radicals that caused the radical addition reaction, and the amount of radicals is the amount of radicals that have energy equal to or higher than the activation energy of the radical addition reaction of the standard substance. Since the energy of each radical generated and emitted for irradiation by the radical irradiation unit is statistically distributed, the radical temperature is obtained based on the amount of radicals that caused radical addition reaction with regard to each of a plurality of standard substances and the activation energies.

An ion analyzer according to a second aspect of the present invention is the ion analyzer according to the first aspect, where the product ions measured by the ion measurement unit is radical adduct ions obtained by adding radicals to the precursor ions.

In the ion analyzer according to the second aspect of the present invention, the radical adduct ions are measured to obtain the amount of radicals that caused radical addition reaction. Precursor ions may be dissociated to generate fragment ions in the radical addition reaction. In such a case, a plurality of ions are generated from a single radical. Since the amount of radical adduct ions is the same as the amount of radicals, the amount of radicals can be obtained more easily and accurately.

An ion analyzer according to a third aspect of the present invention is the ion analyzer according to the first aspect, where the radicals are hydrogen radicals, oxygen radicals, or nitrogen radicals.

In the ion analyzer according to the third aspect of the present invention, the radical temperature of a kind of radicals appropriate for the characteristics of a sample component (for example, a compound containing a peptide or a hydrocarbon chain) and the purpose of analysis can be obtained.

An ion analyzer according to a fourth aspect of the present invention is the ion analyzer according to the first aspect, further including:

an information storage unit;

a radical irradiation condition input receiving unit configured to receive an input of a radical irradiation condition for the radical irradiation unit; and a radical temperature information saving unit configured to save radical temperature information in the information storage unit, where the radical irradiation condition and a radical temperature obtained for the radical irradiation condition are associated with each other in the radical temperature information.

In the ion analyzer according to the fourth aspect of the present invention, the radical temperature information in which the radical irradiation condition and the radical temperature of radicals at which precursor ions are irradiated with the radicals under the radical irradiation condition are associated with each other is obtained, and the radical temperature information is accumulated in the information storage unit to construct a database of the radical temperature information.

An ion analyzer according to a fifth aspect of the present invention is the ion analyzer according to the fourth aspect, further including:

a radical temperature input receiving unit configured to receive an input of radical temperature of radicals with which the precursor ions are irradiated; and a radical irradiation condition determination unit configured to determine, based on the radical temperature information, a condition under which irradiation with radicals having the radical temperature which has been input is performed.

In the ion analyzer according to the fifth aspect of the present invention, by simply inputting the radical temperature, the radical irradiation condition for irradiating the precursor ions with radicals having the radical temperature can easily be determined.

REFERENCE SIGNS LIST

1 . . . Ion Source
10 . . . Heater Power Source Unit
2 . . . Ion Trap
21 . . . Ring Electrode
22 . . . Inlet-Side End Cap Electrode
23 . . . Ion Introduction Hole
24 . . . Outlet-Side End Cap Electrode
25 . . . Ion Ejection Hole
26 . . . Radical Particle Introduction Port
27 . . . Radical Particle Discharge Port
3 . . . Time-of-Flight Mass Separation Unit
4 . . . Ion Detector
5 . . . Radical Irradiation Unit
51 . . . Radical Generation Chamber
52 . . . Raw Gas Supply Source
53 . . . Radio-Frequency Plasma Source
531 . . . Microwave Supply Source
532 . . . Three Stub Tuner
54 . . . Nozzle
541 . . . Ground Electrode
542 . . . Torch
543 . . . Needle Electrode
55 . . . Skimmer
56 . . . Valve
57 . . . Vacuum Pump
6 . . . Inert Gas Supply Unit
61 . . . Inert Gas Supply Source
62 . . . Valve
63 . . . Gas Inlet Pipe
64 . . . Gas Inlet Pipe Heater
7 . . . Trap Voltage Generation Unit
8 . . . Device Control Unit
9 . . . Control/Processing Unit
91 . . . Information Storage Unit
92 . . . Ion Measurement Unit
93 . . . Radical Temperature Calculation Unit
94 . . . Radical Irradiation Condition Input Receiving Unit
95 . . . Radical Temperature Information Saving Unit
96 . . . Radical Temperature Input Receiving Unit
97 . . . Radical Irradiation Condition Determination Unit

The invention claimed is:

1. An ion analyzer for analyzing product ions generated by irradiating precursor ions with a predetermined kind of radicals, the precursor ions being derived from a sample component, the ion analyzer comprising:

a reaction chamber into which the precursor ions are introduced;

a radical irradiation unit configured to generate the a-predetermined kind of radicals and emit the predetermined kind of radicals to an inside of the reaction chamber;

a standard substance supply unit configured to supply a plurality of kinds of standard substances to the reaction chamber, where respective activation energies of reactions of the predetermined kind of radicals with each of the plurality of kinds of standard substances are known, and the activation energies are different in magnitude;

an ion measurement unit configured to measure an amount of predetermined product ions generated from precursor ions derived from each of the plurality of kinds of standard substances by irradiation with the predetermined kind of radicals; and a radical temperature calculation unit configured to obtain an amount of the predetermined kind of radicals that caused a radical addition reaction based on the measured amount of the predetermined product ions and obtain a radical temperature based on a relationship between the amount of the predetermined kind of radicals obtained for each of the plurality of kinds of standard substances and the activation energies.

2. The ion analyzer according to claim 1, wherein the predetermined product ions measured by the ion measurement unit are radical adduct ions obtained by adding the predetermined kind of radicals to the precursor ions.

3. The ion analyzer according to claim 1, wherein the predetermined kind of radicals are hydrogen radicals, oxygen radicals, or nitrogen radicals.

4. The ion analyzer according to claim 1, further comprising:

an information storage unit;

a radical irradiation condition input receiving unit configured to receive an input of a radical irradiation condition of the radical irradiation unit; and a radical temperature information saving unit configured to save radical temperature information in the information storage unit, where the radical irradiation condition and a radical temperature obtained for the radical irradiation condition are associated with each other in the radical temperature information.

5. The ion analyzer according to claim 4, further comprising:

a radical temperature input receiving unit configured to receive an input of radical temperature of the predetermined kind of radicals with which the precursor ions are irradiated; and a radical irradiation condition determination unit configured to determine, based on the radical temperature information, a condition under which irradiation with the predetermined kind of radicals is performed.

* * * * *